United States Patent
Gira

(10) Patent No.: US 12,258,931 B1
(45) Date of Patent: Mar. 25, 2025

(54) WAVE POWER GENERATOR DEVICE

(71) Applicant: Piper Media Inc., Toronto (CA)

(72) Inventor: Richard Raymond Gira, Toronto (CA)

( * ) Notice: Subject to any disclaimer, the term of this patent is extended or adjusted under 35 U.S.C. 154(b) by 0 days.

(21) Appl. No.: 18/896,553

(22) Filed: Sep. 25, 2024

(51) Int. Cl.
*F03B 13/18* (2006.01)
*F03B 13/14* (2006.01)
*F03B 13/22* (2006.01)

(52) U.S. Cl.
CPC .......... *F03B 13/1805* (2013.01); *F03B 13/14* (2013.01); *F03B 13/22* (2013.01)

(58) Field of Classification Search
CPC  F03B 13/1805; F03B 13/181; F03B 13/1815; F03B 13/182; F03B 13/20; F03B 13/22
See application file for complete search history.

(56) References Cited

U.S. PATENT DOCUMENTS

| | | | |
|---|---|---|---|
| 4,241,579 A | 12/1980 | Borgren | |
| 5,854,516 A | 12/1998 | Shim | |
| 6,647,716 B2 | 11/2003 | Boyd | |
| 11,870,306 B2 * | 1/2024 | Weng | H02K 7/1892 |
| 12,055,121 B2 * | 8/2024 | Borigas, Jr. | F03B 13/20 |
| 2010/0026000 A1 * | 2/2010 | Hogmoe | F03B 13/20 |
| | | | 290/53 |
| 2015/0063910 A1 * | 3/2015 | Meltsov | E02B 8/00 |
| | | | 114/230.14 |
| 2019/0178224 A1 * | 6/2019 | Saiz | F03B 13/12 |

FOREIGN PATENT DOCUMENTS

| | | | | |
|---|---|---|---|---|
| DE | 102017105914 A1 * | 9/2018 | | |
| EP | 2531780 A1 | 12/2012 | | |
| GB | 2497459 A * | 6/2013 | ............. | F03B 13/10 |
| KR | 20130130353 A | 12/2013 | | |
| WO | WO-2013013534 A1 * | 1/2013 | ............. | B63B 38/00 |

OTHER PUBLICATIONS

Machine translation of DE-102017105914-A1, accessed Nov. 19, 2024. (Year: 2024).*

* cited by examiner

*Primary Examiner* — Jonathan R Matthias

(57) ABSTRACT

A wave power generator device that is designed specifically to generate electrical power from water currents. To accomplish this, the device includes multiple generator assemblies connected in series along an ocean shoreline. More specifically, each wave power generator includes a floating head and multiple flex points. A plurality of bidirectional rotary generators positioned at each flex point of each assembly helps in harvesting electricity from the oceans water currents that flow in different directions. The device further includes a support structure that provides solid support to the anchoring system of the device in the ocean bed. Furthermore, at least one signaling device such as buoys, LED lights, etc. float around the power generation assemblies on top of the water surface to signal the presence of the device under water, and thereby prevent boats and other near shore elements that may come in the path of the present invention.

11 Claims, 7 Drawing Sheets

WAVE POWER GENERATOR DEVICE

FIELD OF THE INVENTION

The present invention generally relates to a wave power generator. More specifically, the present invention is a wave power generator that is modelled with flex points and shafts mimicking the anatomy of a human body.

BACKGROUND OF THE INVENTION

Ocean wave energy, or just simply wave energy, is a type of ocean based renewable energy source that uses the power of the waves to generate electricity. Unlike tidal energy which uses the ebb and flow of the tides, wave energy uses the vertical movement of the surface water that produces tidal waves. Wave power is typically produced by floating turbine platforms or buoys that rise and fall with the swells. However, wave power can be generated by exploiting the changes in air pressure occurring in wave capture chambers that face the sea or changes in wave pressure on the ocean floor. Similarly, water currents under the upper surface of the ocean closer to the shoreline could become a new source of clean energy. By using rotary generators, the mechanical energy of the spinning blades may be converted into electricity and thus can be used to generate electricity from water currents under the water.

An objective of the present invention is to provide a wave power generator device that has multiple generator assemblies connected in series along the ocean shoreline. Shoreline devices are wave energy devices which are fixed to or embedded in the shoreline, that is they are both in and out of the water. More specifically, the wave power generator is modelled similar to the anatomy of the human body, wherein there is a floating head and flex points similar to that of the neck, hips, knees, and ankles. A plurality of bidirectional water turbine generators positioned at various points of each assembly helps in harvesting electricity from the ocean's water currents at different locations or joints. The specific design of the frame of each assembly, and the positioning and flexibility of bidirectional rotary power generators helps generate much energy from water currents. Further, the present invention comprises a support structure that provides solid support to the anchoring system of the present invention in the ocean bed. Furthermore, at least one signaling device such as buoys or LED lights floating around the device on top of the water surface helps signal the presence of the invention under water, and thereby prevent boats and other near shore elements to stay away from the present invention. Thus, the present invention is a simple power generator device that generates electricity from a clean and renewable source of energy in an efficient manner.

SUMMARY OF INVENTION

The present invention is an apparatus or machine that is designed specifically to generate electrical power from water currents. To accomplish this, the present invention provides a wave power generator device that has multiple generator assemblies connected in series along an ocean shoreline. More specifically, each of the wave power generator assembly is modelled similar to the anatomy of the human body, wherein there is a floating head and flex points similar to that of the neck, hips, knees, and ankles. A plurality of bidirectional water turbine and rotary generators positioned at various points of each assembly helps in harvesting electricity from the ocean's water currents. The specific design of the frame of each assembly, and the positioning and flexibility of bidirectional rotary power generators helps generate much energy from the clean energy source. Further, the present invention comprises a support structure that provides solid support to the anchoring system of the present invention in the ocean bed. Furthermore, at least one signaling device such as buoys, LED lights, etc. float around the power generation assemblies on top of the water surface to signal the presence of the present invention under water, and thereby prevent boats and other near shore elements that may come in the path of the present invention. Thus, the present invention is a simple power generator device that generates electricity from a clean and renewable source of energy in an efficient manner.

DETAILED DESCRIPTION OF THE INVENTION

All illustrations of the drawings are for the purpose of describing selected versions of the present invention and are not intended to limit the scope of the present invention.

In reference to FIG. 1 through FIG. 7, the present invention is a shoreline wave power generator system.

Figure 1:
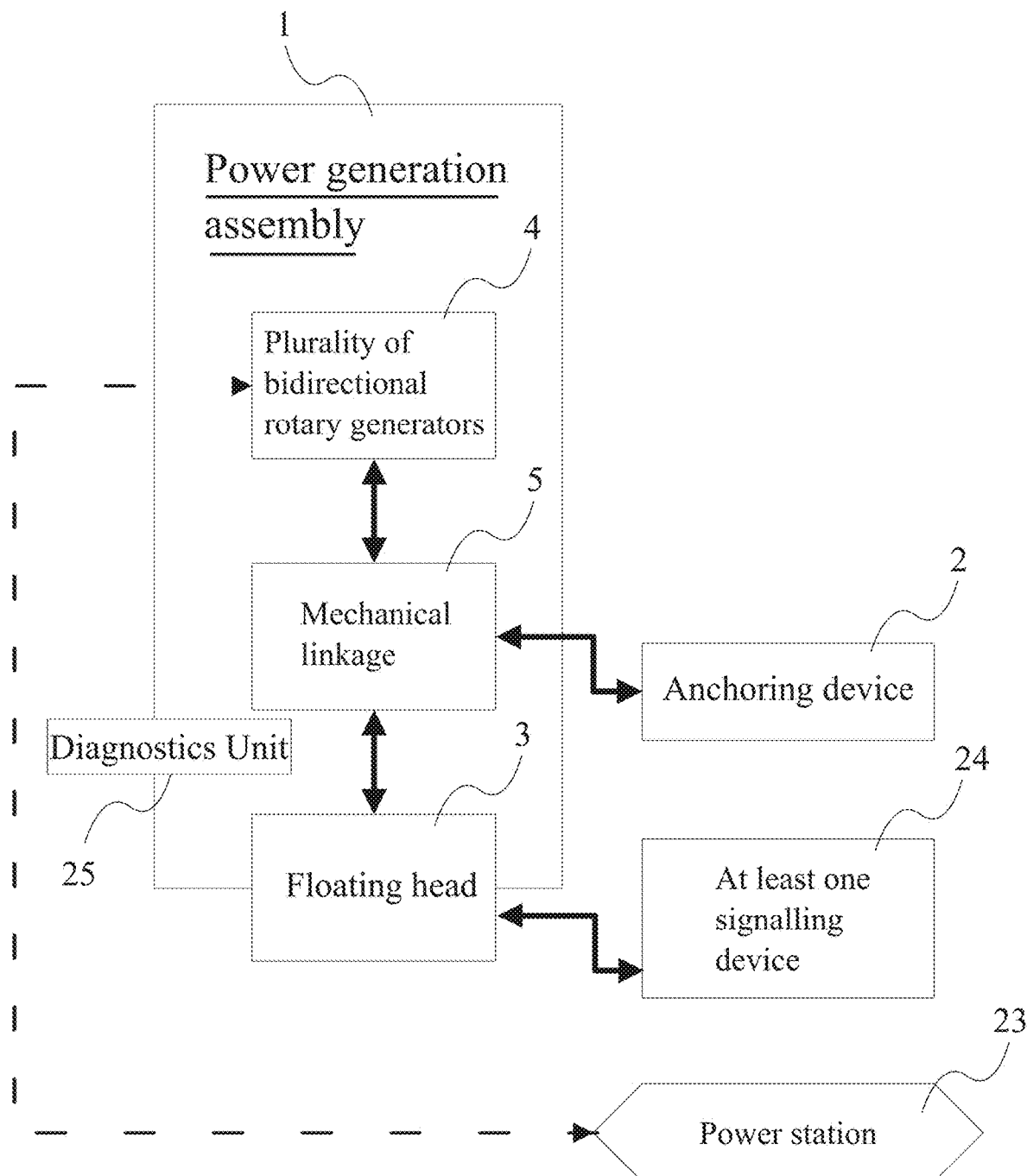
FIG. 1 is a system diagram of the present invention.
Figure 2:
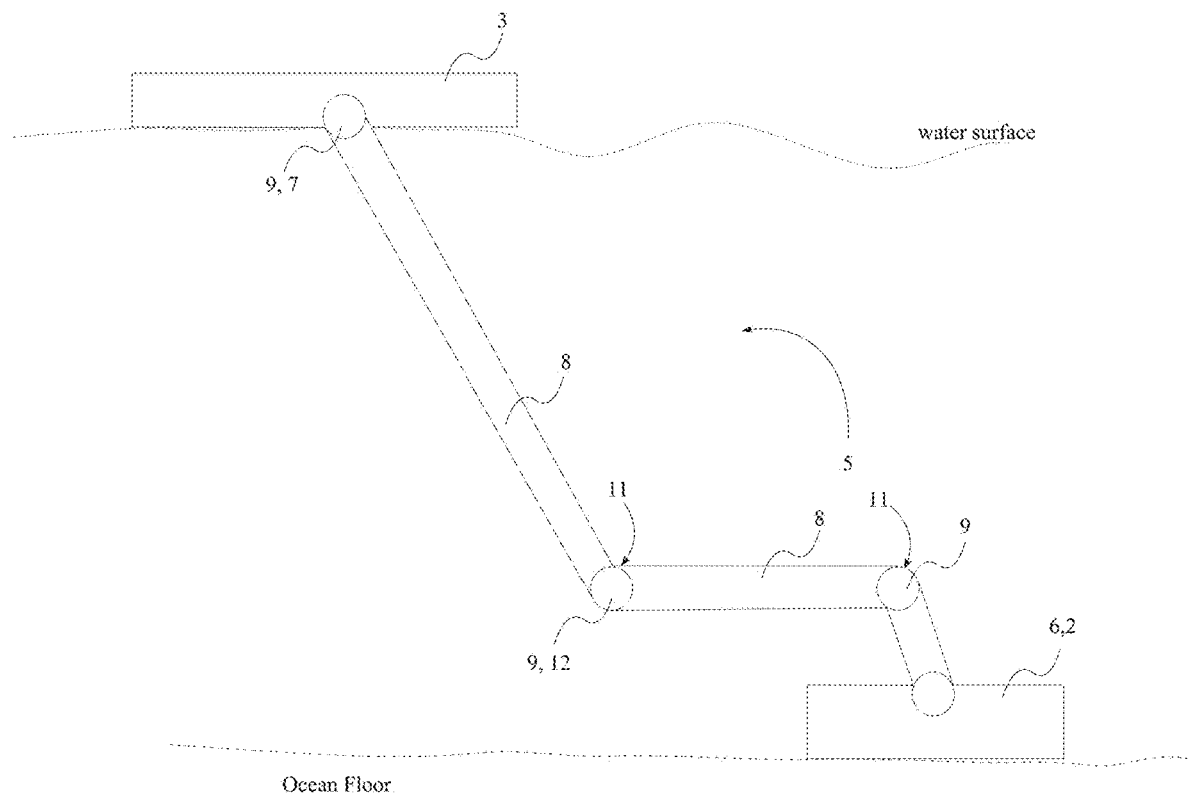
FIG. 2 is a front perspective of a power generation assembly.
Figure 3:
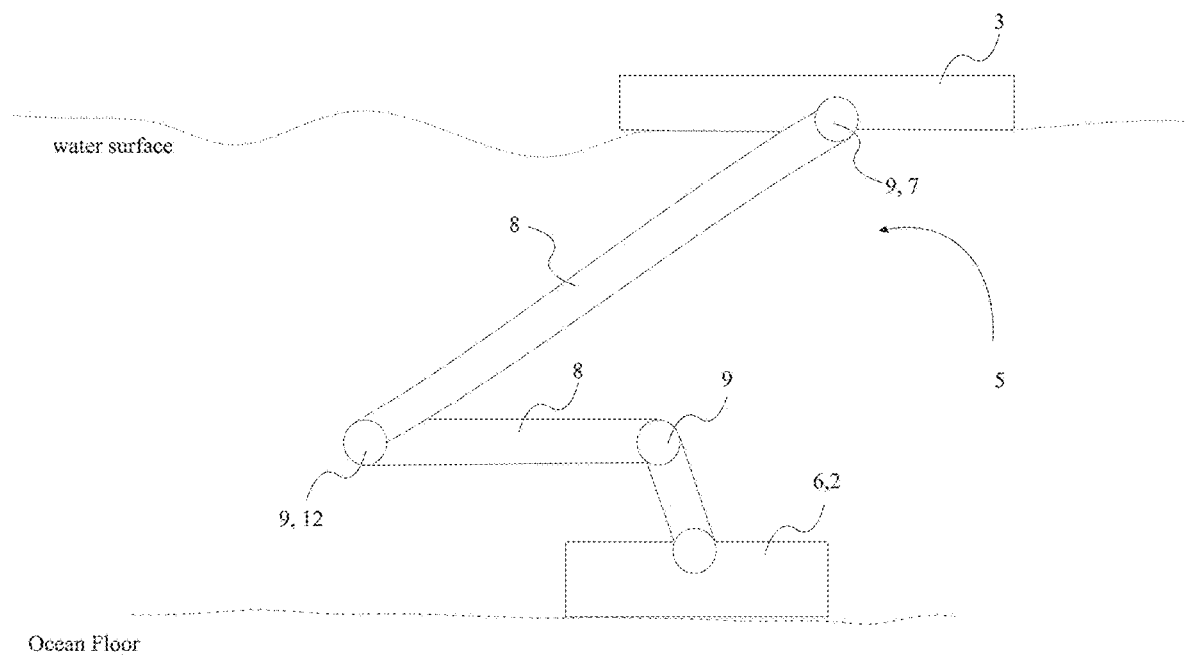
FIG. 3 is a front perspective of a power generation assembly, wherein the water level is low, and the mechanical linkage expands horizontally to align the floating head according to the water level.
Figure 4:
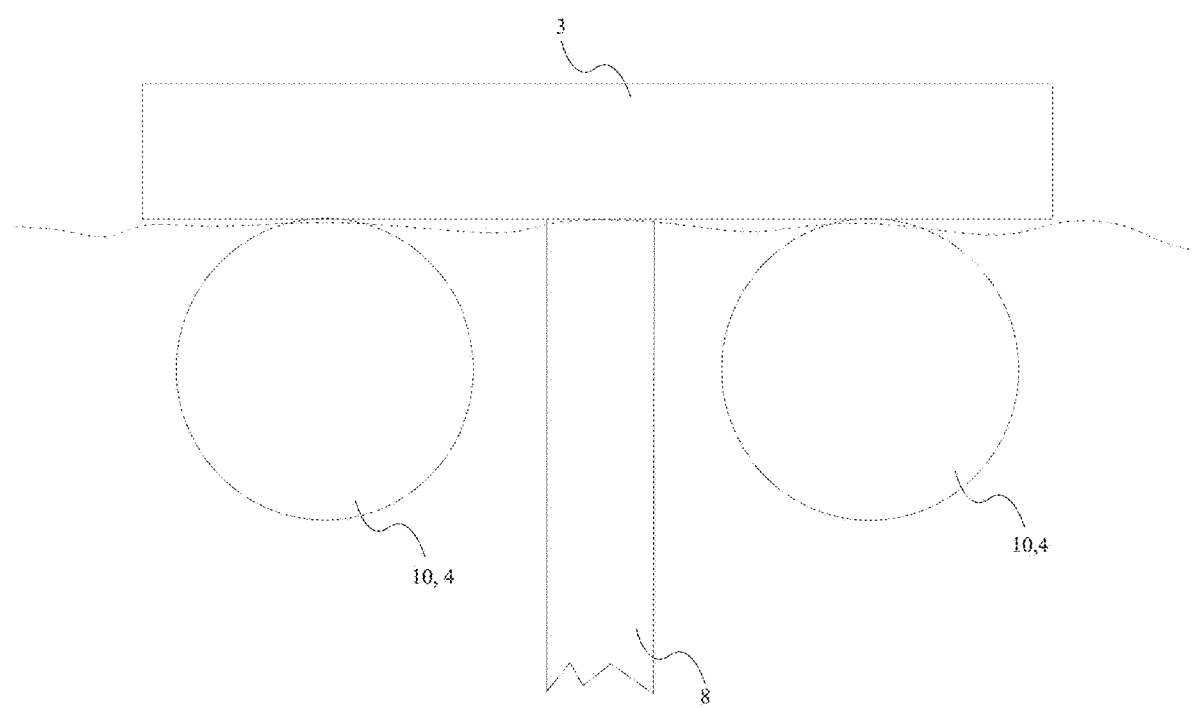
FIG. 4 is a front perspective of a floating head and a plurality of bidirectional rotary generators.

The following description is in reference to FIG. 1 through FIG. 7. According to a preferred embodiment, the present invention comprises a plurality of power generation assemblies 1 and an anchoring device 2. As seen in FIG. 2, each of the plurality of power generation assemblies 1 comprises a floating head 3, a plurality of bidirectional rotary generators 4, and a mechanical linkage 5. Preferably, the floating head 3 is a floating device that can float on top of a water surface. The floating head 3 moves horizontally and vertically in the waves. The horizontal movement includes opposing directions over the anchoring device 2, preferably 45 degrees in either direction above the anchoring device 2. Thus, both vertical and horizontal movement of the floating head 3 can affect power generation. In other words, the device harvests electrical energy from the vertical and horizontal motion of waves and ocean currents. As seen in FIG. 3, at low tide there would be maximum horizontal expansion of the mechanical linkage 5 so that the floating head 3 is a mere few feet above the ocean floor.

In a turbine generator, a moving fluid pushes a series of blades mounted on a rotor shaft. The force of the fluid on the blades spins (rotates) the rotor shaft of a generator. The generator, in turn, converts the mechanical (kinetic) energy of the rotor to electrical energy. A bidirectional rotary generator has two turbines that rotate in both directions (clockwise and counterclockwise), so that water flowing in both directions on the turbines can rotate the turbines and generate electricity. Thus, each generator from the plurality of bidirectional rotary generators 4 is activated when the direction of water current warrants activation.

Figure 5:
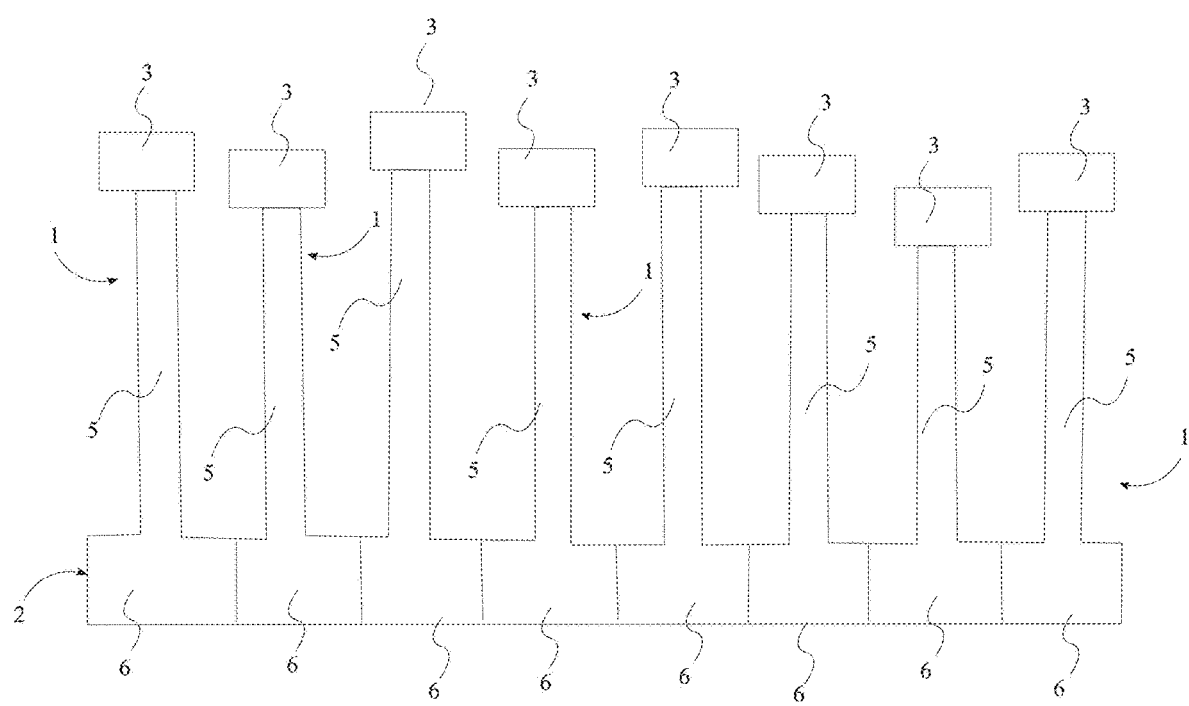
FIG. 5 is a perspective view of a plurality of power generation assemblies connected in series.

The mechanical linkage 5 comprises a proximal linkage end 6, a distal linkage end 7, a linkage body 8, and a plurality of hinged joints 9, wherein the distal linkage end 7 is hingedly connected to the floatation head 3, and the proximal linkage end 6 is hingedly connected to the anchoring device 2. In the preferred embodiment, the proximal linkage end 6 of each of the plurality of power generation assemblies 1 is arranged in series along the anchoring device 2, as seen in FIG. 5. In other words, the proximal linkage end 6 of all the plurality of power generation assemblies 1 constitutes the anchoring device 2. More specifically, each power generation assembly is independently secured to the next via an interlocking system that includes power connections or electrical connections. Thus, there could be hundreds of power generation assemblies that are connected in series along the shoreline (preferably in and around 15 feet of water at high tide).

As seen in FIG. 2 and FIG. 3, the plurality of hinged joints 9 is operatively integrated along the linkage body 8, wherein each of the plurality of hinged joints 9 is used to bend a specific point on the linkage body 8. Further, the plurality of hinged joints 9 is distributed along the linkage body in between the distal linkage end 7 and the proximal linkage end 6. It should be noted that the linkage body 8 may comprise any dimensions, as long as the intents of the present invention are not altered. In other words, appropriate depth of water for generator placement is flexible as limbs of generator modules can be different in length and size for different location applications.

In the preferred embodiment, the plurality of bidirectional rotary generators 4 comprises at least one main generator 10 and a plurality of supplemental generators 11. Preferably, the wave power generator is modeled on the shape of the human body, with flex points at the neck, hips, knees, and ankles proportionately. In other words, the at least one main generator 10 acts like arms or wings in this configuration and the plurality of supplemental generators 11 act like each member of the body that is independently secured at or near the hinged joints for easy assembly and replacement. Accordingly, the at least one main generator 10 is operatively mounted to the floatation head 3, wherein the at least one main generator 10 is used to generate electrical energy from movement of the floatation head 3, and wherein the at least one main generator 10 is used to generate electrical energy from water currents travelling past the floatation head 3. Thus, the at least one main generator 10 is mounted adjacent to the floating head 3. Further, as seen in FIG. 2, each of the plurality of supplemental generators 11 is operatively integrated into a corresponding hinged joint 12 from the plurality of hinged joints 9, wherein each of the plurality of supplemental generators 11 is used to generate electrical energy from movement of the corresponding hinged joint 12, and wherein each of the plurality of supplemental generators 11 is used to generate electrical energy from water currents travelling past the corresponding hinged joint 12. Additionally, all the main components of the present invention are detachably attached with one another, such that it is easy for repair and/or replacement. More specifically, all parts can be replaced as in a Lego system, wherein the joints are waterproof joints and power generation parts are isolated from any hindering elements.

Figure 6:
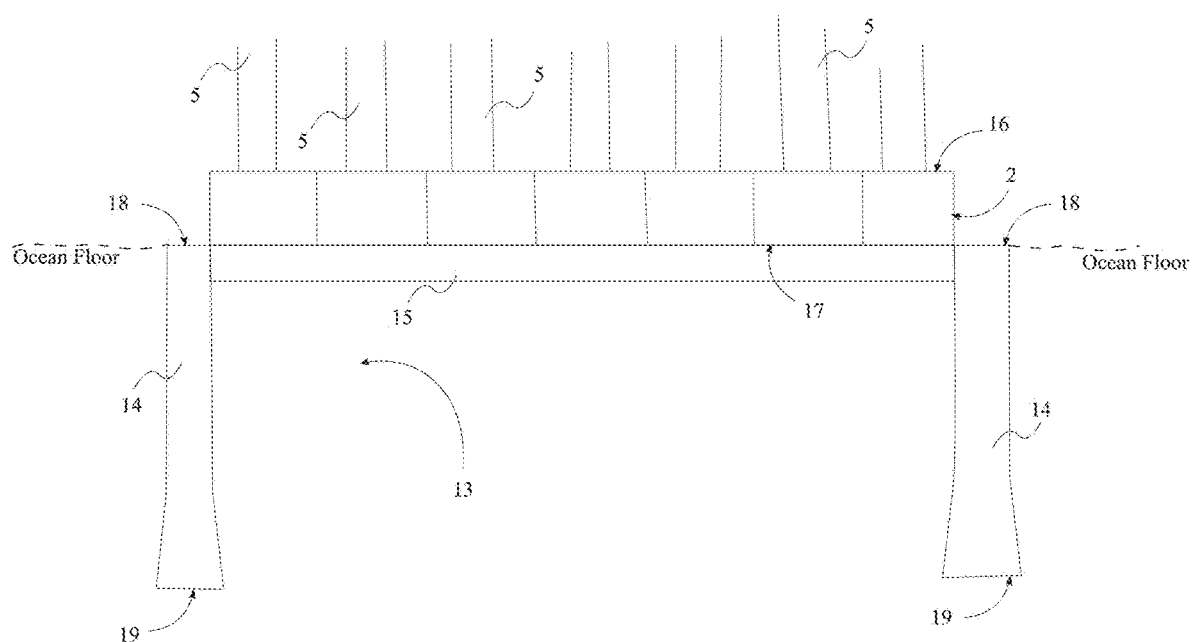
FIG. 6 is a front perspective of a support device according to the present invention.

In order to provide the necessary support for all the components of the present invention under the ocean near the shoreline, the present invention may further comprise a support device 13. Preferably, the support device 13 is mounted adjacent to the anchoring device 2, supporting the anchoring device 2. Further, the support device 13 is configured to penetrate an ocean floor so as to situate the anchoring device 2 on the ocean floor. As seen in FIG. 6, the support device 13 may comprise a plurality of support pillars 14 and a base support 15. In the preferred embodiment, the anchoring device 2 comprises a first anchor surface 16 and a second anchor surface 17, wherein the first anchor surface 16 is positioned opposite to the second anchor surface 17 about the anchoring device 2. In other words, the first anchor surface 16 constitutes a top surface of the anchoring device 2 and the second anchor surface 17 constitutes a bottom surface of the anchoring device 2. Accordingly, the first anchor surface 16 is oriented towards the floating head 3, and the second anchor surface 17 is oriented away from the floating head 3. Preferably, the base support 15 is mounted onto the second anchor surface 17, and the plurality of support pillars 14 is perimetrically distributed about the base support 15. This is so that the plurality of support pillars 14 provides the necessary foundation for the entire base section of the present invention. As seen in FIG. 6, each of the plurality of support pillars 14 may comprise a first pillar end 18 and a second pillar end 19. More specifically, the first pillar end 18 constitutes a top end of each of the plurality of support pillars 14 and the second pillar end 19 constitutes a lower end of each of the plurality of the support pillars 14. Accordingly, the first pillar end 18 is laterally connected to the base support 15, and the second pillar end 19 is positioned offset from the base support 15 within the ocean floor. Additionally, each of the plurality of support pillars 14 may comprise a lower section that may be expanded through external command (like through a switch or command from a control system through an operator) within the ocean floor to provide better anchoring. To accomplish this, a screw type mechanical module may be present in the plurality of support pillars 14 extending from top to bottom to facilitate the expansion anchoring at the bottom. Accordingly, as seen in FIG. 5, each of the plurality of pillar supports 14 tapers from the second pillar end 19 to the first pillar end 18.

Figure 7:
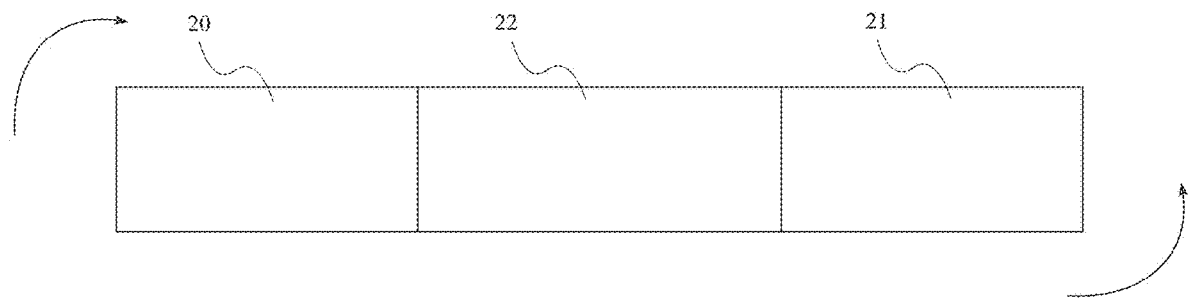
FIG. 7 is a schematic view of a bidirectional rotary generator.

In reference to FIG. 7, and according to the preferred embodiment, each of the plurality of bidirectional rotary generators 4 comprises a clockwise rotation turbine 20, a counterclockwise rotation turbine 21, and a generator body 22. Preferably, the clockwise rotation turbine 20 and the counterclockwise rotation 21 turbine are positioned opposite to each other about the generator body 22. More specifically, a rotation axis of the clockwise rotation turbine 20 and a rotation axis of the counterclockwise rotation turbine 21 are positioned collinear to each other. This is so that electricity may be generated as water currents from different directions fall on the bidirectional rotary generator 4 at each of the plurality of hinged joints 9 or flex point.

In order to collect and distribute the generated current efficiently, the present invention may further comprise a power station 23 and each of the plurality of bidirectional rotary generators 4 is electrically connected to the power station 23. In other words, power generated by each of the plurality of power generation assemblies 1 are connected in series and may be collected by the power holding station on land.

In order to signal boats and other man-made vessels about the presence of the power generation device in the ocean, the present invention may further comprise at least one signaling device 24. Preferably, the at least one signaling device 24 is positioned adjacent to the floating head 3. The at least one signaling device 24 may be mounted onto the floating head 3 and or dispersed around the floating head 3. Accordingly, the at least one signaling device 24 may be detachably attached to the floating head 3, wherein the at least one signaling device 24 is at least one buoy. Further, the at least one signaling device 24 maybe a plurality of illumination devices mounted on top of as well as around the floating head 3 as well.

Additionally, the present invention may further comprise a diagnostics unit 25 integrated into the floating head 3. Preferably, the diagnostics unit 25 tells the power generated by the each of the plurality of power generation assemblies 1, the power generated at each of the plurality of hinged joints 9, and also pinpoints any dysfunctional segments for repair and replacement.

Thus, the present invention is an efficient shoreline wave power generator that helps with harvesting electricity from the ocean's water currents that flow in different directions.

Although the invention has been explained in relation to its preferred embodiment, it is to be understood that many other possible modifications and variations can be made without departing from the spirit and scope of the invention as hereinafter claimed.

What is claimed is:

1. A wave power generator system comprising:
   a plurality of power generation assemblies;
   an anchoring device;
   each of the plurality of power generation assemblies comprising a floating head, a plurality of bidirectional rotary generators, and a mechanical linkage;
   the mechanical linkage comprising a proximal linkage end, a distal linkage end, a linkage body, and a plurality of hinged joints;
   the plurality of bidirectional rotary generators comprising at least one main generator and a plurality of supplemental generators;
   each of the plurality of bidirectional rotary generators comprising a clockwise rotation turbine, a counter-clockwise rotation turbine, and a generator body;
   the distal linkage end being hingedly connected to the floatation head;
   the proximal linkage end being hingedly connected to the anchoring device;
   the plurality of hinged joints being operatively integrated along the linkage body, wherein each of the plurality of hinged joints is used to bend a specific point on the linkage body;
   the plurality of hinged joints being distributed along the linkage body in between the distal linkage end and the proximal linkage end;
   the at least one main bidirectional rotary generator being operatively mounted to the floatation head, wherein the at least one main bidirectional rotary generator is used to generate electrical energy from movement of the floatation head, and wherein the at least one main bidirectional rotary generator is used to generate electrical energy from water currents travelling past the floatation head;
   each of the plurality of supplemental bidirectional rotary generators being operatively integrated into a corresponding hinged joint from the plurality of hinged joints, wherein each of the plurality of supplemental bidirectional rotary generators is used to generate electrical energy from movement of the corresponding hinged joint, and wherein each of the plurality of supplemental bidirectional rotary generators is used to generate electrical energy from water currents travelling past the corresponding hinged joint;
   the clockwise rotation turbine and the counterclockwise rotation turbine being positioned opposite to each other about the generator body; and
   a rotation axis of the clockwise rotation turbine and a rotation axis of the counterclockwise rotation turbine being positioned collinear to each other.

2. The wave power generator system of claim 1, wherein the proximal linkage end of each of the plurality of power generation assemblies is arranged in series along the anchoring device.

3. The wave power generator system of claim 1, wherein the at least one main bidirectional rotary generator is mounted adjacent to the floating head.

4. The wave power generator system of claim 1 further comprising:
   a support device;
   the support device being mounted adjacent to the anchoring device, supporting the anchoring device; and
   the support device being configured to penetrate an ocean floor and to situate the anchoring device on the ocean floor.

5. The wave power generator system of claim 4 further comprising:
   the support device comprising a plurality of support pillars and a base support;
   the anchoring device comprising a first anchor surface and a second anchor surface, wherein the first anchor surface is positioned opposite to the second anchor surface about the anchoring device;
   each of the plurality of support pillars comprising a first pillar end and a second pillar end;
   the first anchor surface being oriented towards the floating head;
   the second anchor surface being oriented away from the floating head;
   the base support being mounted onto the second anchor surface;
   the plurality of pillar supports being perimetrically distributed about the base support;
   the first pillar end being laterally connected to the base support; and
   the second pillar end being positioned offset from the base support within the ocean floor.

6. The wave power generator system of claim 5, wherein each of the plurality of pillar supports tapers from the second pillar end to the first pillar end.

7. The wave power generator system of claim 1 further comprising:
   a power station; and
   each of the plurality of bidirectional rotary generators being electrically connected to the power station.

8. The wave power generator system of claim 1 further comprising:
   at least one signaling device;
   the at least one signaling device being positioned adjacent to the floating head.

9. The wave power generator system of claim 8, wherein the at least one signaling device is detachably attached to the floating head.

10. The wave power generator system of claim 8, wherein the at least one signaling device is a plurality of illumination devices.

11. The wave power generator system of claim 8, wherein the at least one signaling device is at least one buoy.

* * * * *